Patented Aug. 11, 1953

2,648,685

UNITED STATES PATENT OFFICE 2,648,685

PRODUCTION OF CARBOXYLIC
ACID AMIDES

Walter Reppe, Ludwigshafen (Rhine), and August Magin, Mutterstadt, Pfalz, Germany No Drawing. Application February 9, 1950, Serial No. 143,363. In Germany October 1, 1948

8 Claims. (Cl. 260—347.3)

The present invention relates to the production of carboxylic acid amides, and, more particularly, to the production of aliphatic or cycloaliphatic compounds containing at least one carboxylic acid amide group. It is an object of the present invention to prepare these compounds from readily available basic materials, i. e. carbon monoxide, ammonia and olefinic compounds, such as olefinic hydrocarbons, alcohols, ethers, and the like.

We have found, and this constitutes an object of our invention, that carboxylic acid amides may be produced by causing carbon monoxide and ammonia or primary or secondary amino compounds to act on olefines at elevated temperature and under increased pressure in the presence of certain catalysts.

We have found that the cyanides of metals capable of forming carbonyls, when used in the interaction of the above mentioned three components will give high yields in carboxylic acid amides according to the following equation:

$$CH_2=CH_2+CO+NH_3 \rightarrow CH_3-CH_2-CONH_2$$

The above equation is illustrative of the simplest type of the reaction carried out according to our invention. In this equation the ethylene shown may be replaced by other olefines, and the ammonia be replaced by primary or secondary amines.

The most active catalysts of the type identified above are the complex nickel cyanides, e. g. the so-called "Belucci" salt $K_2[Ni^{II}Cy_3]$, potassium tetracyanoniccolate $K_2[Ni^{II}Cy_4]$ or the corresponding complex salts of other alkali metals such as sodium or lithium, or of alkaline earth metals such as calcium, barium, and magnesium, or of other bivalent metals, such as zinc, cadmium or mercury, or of ammonia as well as the ammine compounds. Most suitable catalysts are such complex nickel cyanides as are capable of forming addition compounds with carbon monoxide or olefines wherein the linkage is reversible or the carbon monoxide or olefine is exchangeable with compounds containing cyano groups. Instead of the ready-made complex compounds we may also use compounds capable of forming such complex compounds, e. g. mixtures of metal cyanides and nickel-II-cyanide or a mixture of ammonia with nickel cyanide.

The catalysts defined above may be used in a state of dissolution or suspension. They may also be applied to the conventional carrier substances, such as aluminum oxide, silicic acid gel or pumice stone.

Generally speaking, we may use as starting materials any compounds containing an olefinic linkage, i. e. a double linkage between two aliphatic carbon atoms. Olefinic hydrocarbons of the aliphatic series, such as ethylene, propylene, butylene, butadiene, diisobutylene and their homologues, and cyclic olefines, such as cyclohexene, cyclooctene, terpenes or styrene, are the most suitable initial materials. Olefines containing substituents, e. g. allyl chloride, unsaturated alcohols, e. g. allyl alcohol, butene-3-ol-2, butene-2-diol-1.4, unsaturated ethers, e. g. dihydrofurane, or olefine carboxylic acids may also be used. Instead of ammonia we may use primary or secondary amines, in particular low molecular aliphatic amines such as mono- or dimethyl-, -ethyl-, -propyl-amine and their homologues, cyclic amines such as cyclohexylamine, piperidine, pyrrolidine or hexamethylene imine.

It is possible to carry out our process at temperatures of about 100° C., preferably at temperatures between 100 and 200° C. or even higher. The speed of the reaction depends on the pressure employed and, therefore, we prefer to work at a carbon monoxide pressure of at least 20 atmospheres, preferably of 50 to 200 atmospheres. The reaction may be carried out according to the batch method in high pressure vessels or continuously, e. g. to the counter- or direct-current process with rigidly arranged catalysts while circulating the carbon monoxide or the carbon monoxide-olefine mixture. When using such circulation, the carbon dioxide formed according to the equation $$CO+H_2O \rightarrow CO_2+H_2$$

is preferably eliminated prior to reintroducing the carbon monoxide into the process. We may also work in the liquid phase with dissolved or suspended catalysts, if desired, while circulating olefines and carbon monoxide through the liquid.

We prefer to carry out the process while using water as a solvent, but we may also use or add other solvents, such as organic oxygen-containing solvents miscible with water, e. g. ethers or ketones or even saturated hydrocarbons, especially when using higher molecular olefines as initial materials. We may also dilute the gases taking part in the reaction. They may contain nitrogen, methane, or other gases. We may also use technical gases, such as water gas, or generator gas, or crude olefines. The ratio between carbon monoxide and olefine may vary to a large extent.

As to the nature of the reaction products formed according to our invention, we have already stated that carboxylic acid amide is the main product. Thus, as shown above, propionic acid amide is formed from ethylene, carbon monoxide and ammonia; adipic acid diamide or isovaleric acid amide may be formed from butadiene, carbon monoxide and ammonia. Depending on the reaction conditions which may be varied by changing the temperature, the pressure, the time of contact, the pH value, the type of catalyst, the CO:olefine ratio, the ammonia concentration, and so on, other nitrogen containing compounds may be formed. These may consist of more or less high molecular cyclic compounds which may contain carboxylic acid groups and which may be obtained in the form of their salts with ammonia or amines. The hydrogen eventually formed by conversion of carbon monoxide with water may also be responsible for the transformation of the primary products into secondary ones.

The products according to our invention may be used for the production of plastics or intermediates for various application fields, e. g. plasticizers, lacquers, resins, textile assistants or tanning agents. By further chemical reactions, e. g. hydrogenation, oxidation, dehydration, amination, or vinylation, they may be converted into carboxylic acids, alcohols, amines, derivatives of the furane or pyrole series, cyclic unsaturated or saturated compounds, and so on.

The following examples will further illustrate how our invention may be carried out in practice without restricting it to these examples.

*Example 1*

A pressure-tight vessel of stainless steel (content 5 liters) is charged with a solution of 110 grams of nickel cyanide in 1240 grams of a 19.4 per cent aqueous ammonia solution. After having expelled the air by nitrogen, about 400 grams of ethylene are pressed in at room temperature thus attaining a pressure of 50 atmospheres. Carbon monoxide is then pressed in until the total pressure has reached 100 atmospheres. The reaction mixture is then heated to 110° C. while stirring. Carbon monoxide is pressed in to maintain a total pressure of 120 atmospheres until it is no longer consumed. After about 10 hours the reaction mixture is allowed to cool to 50° C., and the pressure released whereby unchanged carbon monoxide and a small amount of nickel carbonyl is obtained.

The reaction mixture forms a clear solution. It is heated to expell excess ammonia and extracted with ether, after cooling. By freezing the extract 120 grams of an almost pure propionic acid amide are obtained and filtered off. The filtrate is subjected to distillation yielding 22 grams of free propionic acid and further 100 grams of propionic acid amide. There are also obtained 55 grams of a fraction which distills at from 140 to 180° C. under 0.3 millimeter. After recrystallization from toluene the product melts at 164° C. and constitutes a composition of the formula $C_7H_{12}N_2O_2$.

The reaction product remaining after the extraction is concentrated by removing the water, thus yielding 115 grams of a sirupy residue. This is admixed with 100 grams of alcohol and is thereby converted into 60 grams of a white crystallized compound (M. P. 180 to 182° C.). It constitutes an ammonia salt and by dissolving in water and acidification may be converted into dicarboxylic acid of the formula $C_{12}H_{19}O_6N_3$ (M. P. 142° C.).

*Example 2*

A reaction vessel of the type described in Example 1 is charged with a mixture consisting of 500 grams of dihydrofurane, 400 grams of water, 600 grams of methanol, 190 grams of anhydrous ammonia and 71 grams of nickel cyanide. After having replaced the air by nitrogen, and the nitrogen by carbon monoxide this latter gas is pressed in under 30 atmospheres pressure. The vessel is heated while stirring to about 135° C. and the pressure maintained at about 70 atmospheres by continuously replenishing carbon monoxide. After 7 hours a total of 89 atmospheres of carbon monoxide has been consumed. The vessel is released from pressure while the gases are led through a condenser cooled with Dry Ice whereby 17 grams of nickel carbonyl are liquified.

The reaction mixture is distilled until the ammonia, nickel carbonyl, methanol, and unchanged dihydrofurane are driven off, and the distillate consists only of water. The remaining solution is filtered off from the deposited nickel cyanide, evaporated in vacuo and fractionated. The following fractions were obtained:

I. 291 grams (B. P. 70 to 130° C. under 0.3 millimeter).
II. 112 grams (B. P. 30 to 140° C. under 0.3 millimeter. This fraction solidifies to form crystals consisting substantially of tetrahydrofurane carboxylic acid amide.
III. 2.5 grams (B. P. 140 to 170° C. under 0.3 to 0.8 millimeter).
IV. Residue consisting of 136 grams.

Fraction I consists mainly of tetrahydrofurane carboxylic acid and a small amount of ammonium formiate. It is treated with a 20 per cent aqueous caustic soda lye to expell the ammonia, and consequently neutralized with sulfuric acid. The solution is extracted with ether and the extract subjected to fractional distillation. After 10 grams of formic acid 170 grams of tetrahydrofurane carboxylic acid (B. P. 85 to 88° C. under 0.3 millimeter) are obtained.

The residue (IV) is treated in the same manner as fraction number I. An additional amount of 32 grams of tetrahydrofurane carboxylic acid is thus obtained.

*Example 3*

A reaction vessel of the type described in Example 1 is charged with a mixture of 600 grams of methanol, 400 grams of water, 200 grams of ammonia, 71 grams of nickel cyanide and 10 grams of hydroquinone. After having replaced the air by nitrogen and the nitrogen by carbon monoxide 150 grams of butadiene are added and carbon monoxide is pressed in under 30 atmospheres. The vessel is then heated, while stirring, to 140° C., while the pressure increases to 80 atmospheres. This pressure is maintained by continuously replenishing the carbon monoxide. After 3½ hours further 150 grams of butadiene are added and the pressing in of carbon monoxide is continued. After 14 hours a total of 35 atmospheres of carbon monoxide is consumed by the reaction mixture. The pressure is then released and the gases led through a condenser cooled with Dry Ice. Of the 38 grams of the liquid thus obtained 78 per cent are butylene, the balance butadiene and butane.

The reaction product is freed from methanol excess ammonia and dimerized butadiene by distillation and then extracted with ether. After the ether has been removed the extract yields a dark crystallized material (M. P. 133 to 140° C.) which after recrystallization from toluene yields 81 grams of a pale pure isovaleric acid amide.

What we claim is:

1. A process for the production of carboxylic acid amides which comprises reacting an olefinic compound with carbon monoxide and an aminating compound from the group consisting of ammonia, primary amines and secondary amines in the presence of a cyanide of a metal capable of forming metal carbonyls, at a temperature between 100° C. and 200° C. and a pressure exceeding 20 atmospheres.

2. A process for the production of carboxylic acid amides which comprises reacting an olefinic compound with carbon monoxide and an aminating compound from the group consisting of ammonia, primary amines and secondary amines in the presence of a complex nickel-cyanide catalyst at a temperature between 100° C. and 200° C. and a pressure exceeding 20 atmospheres.

3. A process for the production of carboxylic acid amides which comprises reacting an olefinic compound with carbon monoxide and an aminating compound from the group consisting of ammonia, primary amines and secondary amines in the presence of a nickel-cyanide catalyst from the group consisting of nickel cyanide, alkali metal nickel cyanides, alkaline earth metal nickel cyanides, nickel cyanide salts of zinc, cadmium and mercury, and ammonium nickel cyanides, at a temperature between 100° C. and 200° C. and a pressure exceeding 20 atmospheres.

4. A process for the production of carboxylic acid amides which comprises reacting an aliphatic olefinic hydrocarbon with carbon monoxide and ammonia in the presence of a complex nickel-cyanide catalyst and water at a temperature between 100° C. and 200° C. and a pressure exceeding 20 atmospheres.

5. A process for the production of carboxylic acid amides which comprises reacting ethylene with carbon monoxide and ammonia in the presence of nickel cyanide and water at a temperature between 100° C. and 200° C. and a pressure exceeding 20 atmospheres.

6. A process for the production of propionic acid amide which comprises reacting about 400 grams ethylene with carbon monoxide and about 1240 grams of a 19.4 per cent aqueous ammonia solution in the presence of about 110 grams of nickel cyanide, heating the mixture to about 110° C. and adding carbon monoxide to maintain a total pressure of about 120 atmospheres.

7. A process for the production of tetrahydrofurane carboxylic acid amide which comprises reacting about 500 grams of dihydrofurane with carbon monoxide and about 400 grams of water, 600 grams of methanol and about 190 grams of anhydrous ammonia in the presence of about 71 grams of nickel cyanide, heating the mixture to about 135° C. and adding carbon monoxide to maintain a total pressure of about 70 atmospheres.

8. A process for the production of isovaleric acid amide which comprises reacting about 150 grams of butadiene with carbon monoxide and about 400 grams of water, 600 grams of methanol and 200 grams of ammonia in the presence of about 71 grams of nickel cyanide and 10 grams of hydroquinone, heating the mixture to about 140° C. and adding carbon monoxide to maintain a total pressure of about 80 atmospheres.

WALTER REPPE.
AUGUST MAGIN.

References Cited in the file of this patent

UNITED STATES PATENTS

| Number | Name | Date |
|---|---|---|
| 2,422,631 | Olin et al. | June 17, 1947 |
| 2,422,632 | Olin et al. | June 17, 1947 |
| 2,448,368 | Gresham et al. | Aug. 31, 1948 |
| 2,497,310 | Larson | Feb. 14, 1950 |
| 2,542,766 | Gresham | Feb. 20, 1951 |

OTHER REFERENCES

Modern Plastics, Nov. 1945, vol. 23, pp. 162–165 and 210.

Fiat Final Report No. 273, Oct. 2, 1945, pp. 9–12.

Du Pont "Bull. Soc. Chem. France," 1948, pp. 529–532.